US011970822B1

(12) United States Patent
Samuelson

(10) Patent No.: US 11,970,822 B1
(45) Date of Patent: Apr. 30, 2024

(54) POWDER TOOL

(71) Applicant: MaryAnn Samuelson, Cherry Valley, CA (US)

(72) Inventor: MaryAnn Samuelson, Cherry Valley, CA (US)

( * ) Notice: Subject to any disclaimer, the term of this patent is extended or adjusted under 35 U.S.C. 154(b) by 177 days.

(21) Appl. No.: 17/670,035

(22) Filed: Feb. 11, 2022

(51) Int. Cl.
*D21H 25/08* (2006.01)
*B31F 1/07* (2006.01)

(52) U.S. Cl.
CPC ............... *D21H 25/08* (2013.01); *B31F 1/07* (2013.01); *B31F 2201/0758* (2013.01)

(58) Field of Classification Search
CPC .... B31F 2201/0758; B31F 1/07; D21H 25/08
See application file for complete search history.

(56) References Cited

U.S. PATENT DOCUMENTS

| | | | | |
|---|---|---|---|---|
| 9,204,704 B1* | 12/2015 | Wolfe | A46B 11/0058 | |
| 9,468,287 B1* | 10/2016 | Barnard | A46B 17/06 | |
| 2005/0181292 A1* | 8/2005 | Fujii | G03G 5/0679 | 430/72 |
| 2007/0166501 A1* | 7/2007 | Seitz | D21H 27/001 | 156/289 |
| 2007/0249805 A1* | 10/2007 | Ittel | C07K 7/06 | 530/300 |
| 2009/0014140 A1* | 1/2009 | Dykstra | D21H 19/50 | 162/160 |
| 2009/0314446 A1* | 12/2009 | Lu | D21H 21/06 | 524/548 |
| 2011/0183100 A1* | 7/2011 | Lee | C09J 153/02 | 156/60 |
| 2012/0024742 A1* | 2/2012 | Berger | B65D 23/02 | 206/524.1 |
| 2013/0121752 A1* | 5/2013 | Byun | A46B 7/023 | 401/269 |
| 2015/0273880 A1* | 10/2015 | Fujihara | B41J 11/007 | 347/104 |
| 2016/0353874 A1* | 12/2016 | Vankov | A46D 1/08 | |
| 2018/0184783 A1* | 7/2018 | Cheng | A45D 33/02 | |

OTHER PUBLICATIONS

Amazon.com: Refillable Powder Brush by Nourisse, Large Capacity, Full Soft Brush, Vegan, One Empty Brush: Beauty & Personal Care, 8 pp. (Feb. 3, 2022).
FYD Powder Dispensing Brush Private Label Powder With Containers Wholesale Refillable Foundation Brush Loose Powder, Alibaba.com (2022).

* cited by examiner

*Primary Examiner* — David H Banh
(74) *Attorney, Agent, or Firm* — Shane Cortesi

(57) ABSTRACT

The present disclosure provides a method of preparing paper. In some embodiments, the method involves a) providing an applicator comprising a housing comprising a top, a bottom, a height extending from the top to the bottom, an interior comprising a reservoir, the reservoir comprising a powder, a removable lid, and a base opposite the removable lid and comprising a channel, the applicator further comprising an applicator head extending from the bottom of the housing and in communication with the channel; b) providing a paper substrate; c) positioning the applicator head on the paper substrate; d) allowing the powder to contact the paper substrate and/or applicator head; and/or e) using the plurality of applicator head to move powder about the paper substrate.

8 Claims, 7 Drawing Sheets

POWDER TOOL

BACKGROUND

Technical Field

The present invention relates to preparation of paper for crafting and other purposes.

Background of the Invention

In the embossing process, the presence of oils and/or static on the paper substrate is not desirable.

Traditionally, users apply a talc bag over paper prior to embossing. However, this process is messy and, in addition, touching the talc bag can itself lead to the deposition of oils.

Thus, there is a continuing need for preparing paper prior to embossing.

It has surprisingly been found that adding powder to a type of applicator used in the cosmetic field and then brushing the bristles of the applicator against paper has been found to be a clean, effective and easy-to-use method to prepare paper prior to embossing.

SUMMARY OF THE INVENTION

The present disclosure provides an apparatus and method for removal of oil and/or static from paper.

BRIEF DESCRIPTION OF THE DRAWINGS

in FIG. 1, the applicator is upside down, the removable cap is covering the bristles, and the removable sleeve in the resting position.

DETAILED DESCRIPTION

Figure 1:
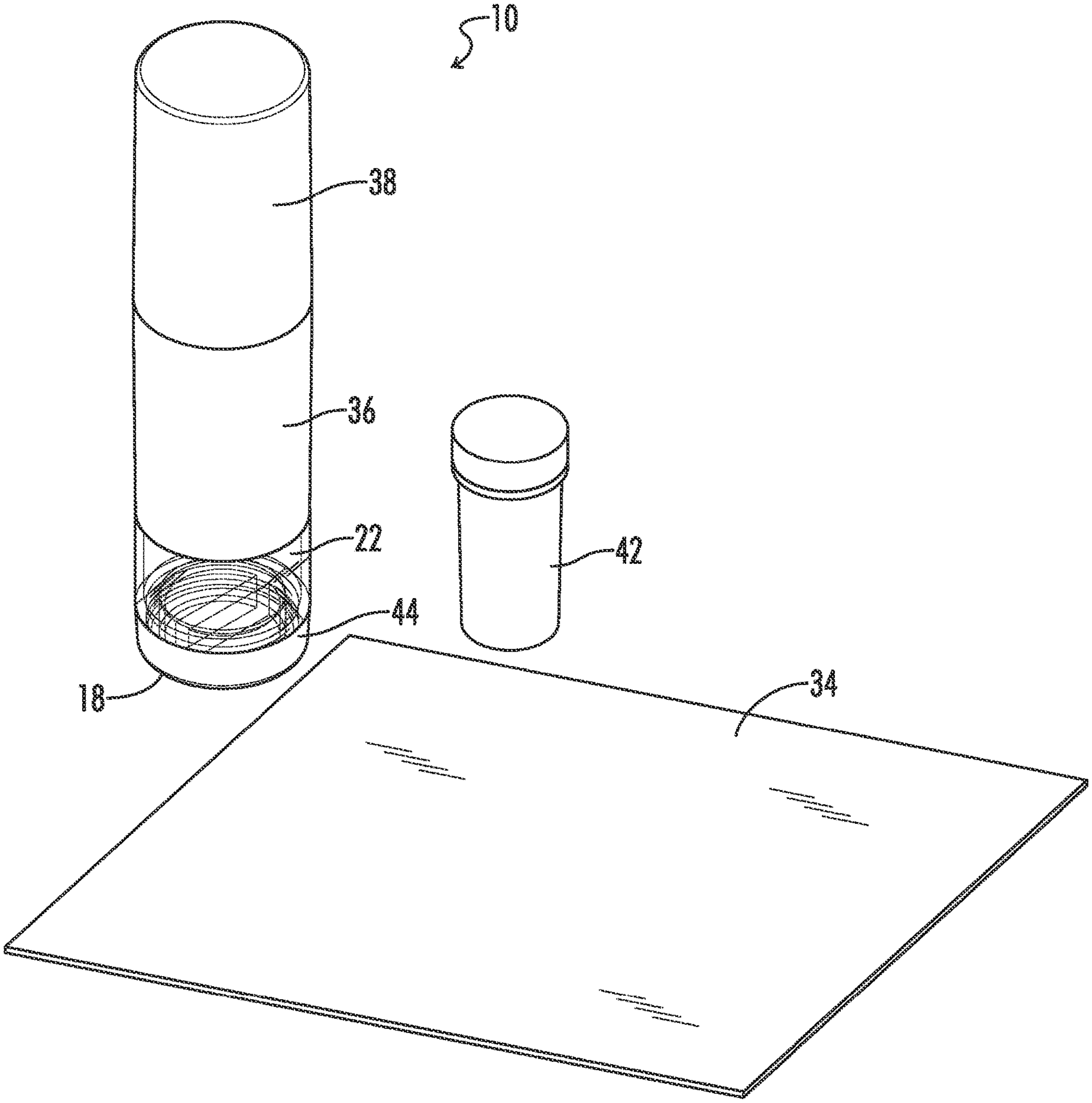
FIG. 1 illustrates a side perspective view of an applicator of one embodiment of the present invention together with a powder container and paper substrate.
Figure 2:
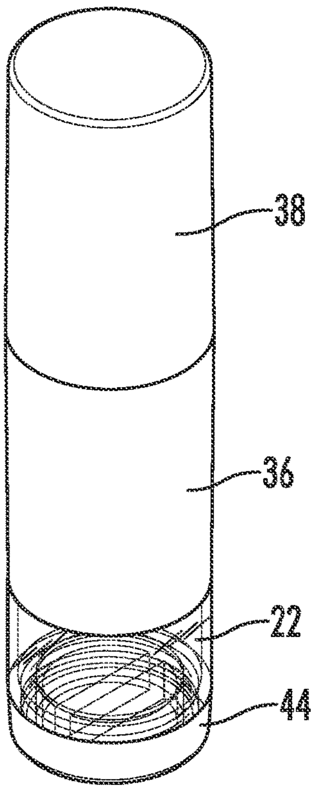
FIG. 2 illustrates a side perspective view of the applicator of FIG. 1 with the removable cap covering the bristles, and the removable sleeve in the resting position.

With reference to FIGS. 1-13 the present disclosure provides a hands-free oil removal applicator 10 designated by the numeral 10. In the drawings, not all reference numbers are included in each of the drawings for the sake of clarity. FIGS. 1-12 are drawn generally to scale, however, it will be appreciated that other dimensions are possible.

Figure 3:
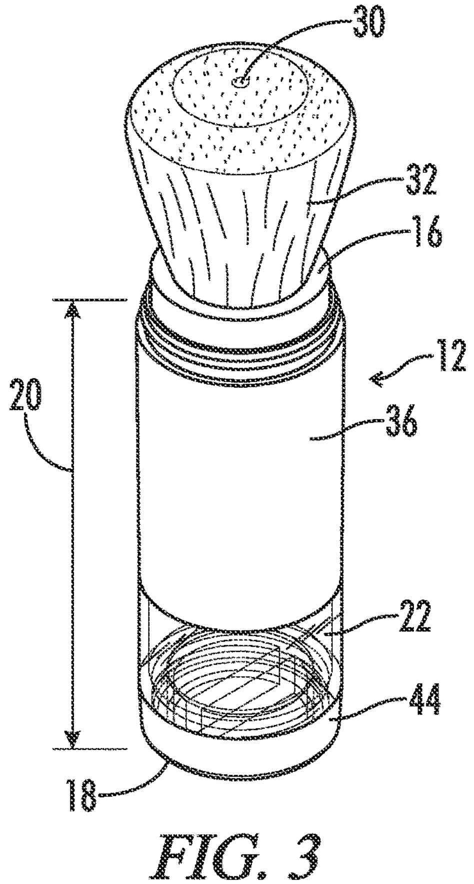
FIG. 3 illustrates a side perspective view of the applicator of FIG. 1 with the removable cap removed and the removable sleeve in the resting position.
Figure 4:
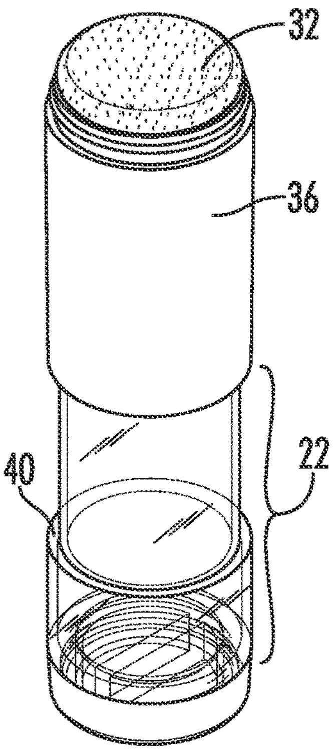
FIG. 4 illustrates a side perspective view of the applicator of FIG. 1 with the removable cap removed and the removable sleeve in the over-bristle position.
Figure 5:
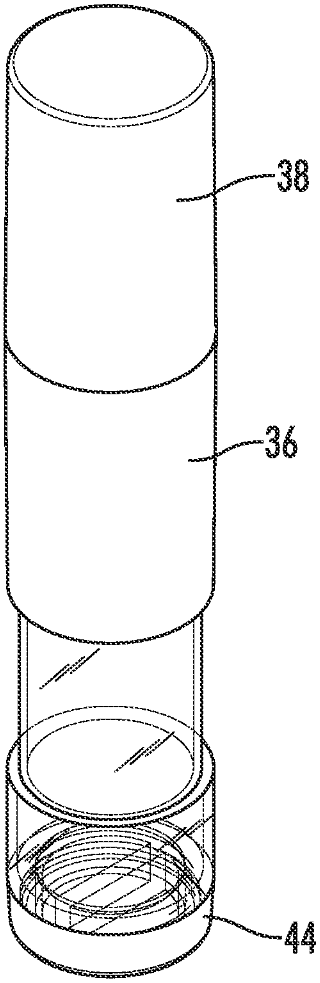
FIG. 5 illustrates a side perspective view of the applicator of FIG. 1 with the removable cap covering the bristles and the removable sleeve in the over-bristle position.
Figure 6:
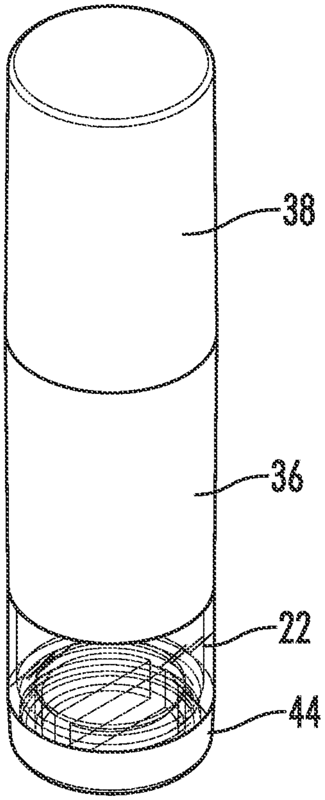
FIG. 6 illustrates a side perspective view of the applicator of FIG. 1 with the removable cap covering the bristles and the removable sleeve in the resting position.
Figure 7:
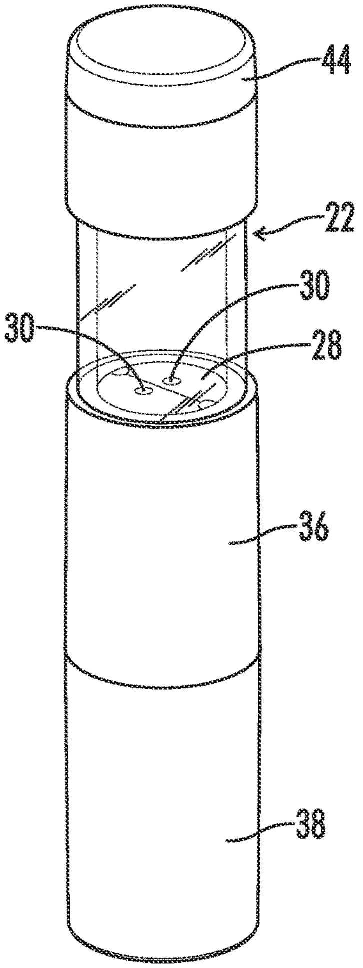
FIG. 7 illustrates a side perspective view of the applicator of FIG. 1 with the applicator upright, the removable cap covering the bristles and the removable sleeve in the over-bristle position.

In certain embodiments, the present disclosure provides a method of removing oil from a paper substrate 34. The method may include a) providing an applicator 10 that may comprise a housing 12 that may comprise a top 18, a bottom 16, a height 20 extending from the top 18 to the bottom 16, an interior 14 comprising a reservoir 22, the reservoir 22 comprising a powder 24, a removable lid 26 forming a top of the reservoir 22, and a base 28 opposite the removable lid 26 and forming a bottom of the reservoir 22 and comprising one or more channels 30. The sidewalls of the reservoir 22 are preferably clear as shown in the illustrated embodiment of FIGS. 1-12 and the channel(s) 30 are best seen in FIGS. 3 and 7.

The applicator 10 may further comprise an applicator head 32 extending from the bottom 16 of the housing 12 and in communication with the channel(s) 30. In some embodiments, the applicator head 32 is a brush 32 comprising a plurality of bristles 32. Optionally, the bristles 32 are comprised of nylon.

In FIGS. 1-6, the applicator 10 is shown upside down and, in FIGS. 7-12, the applicator 10 is shown in its upright orientation.

Figure 12:
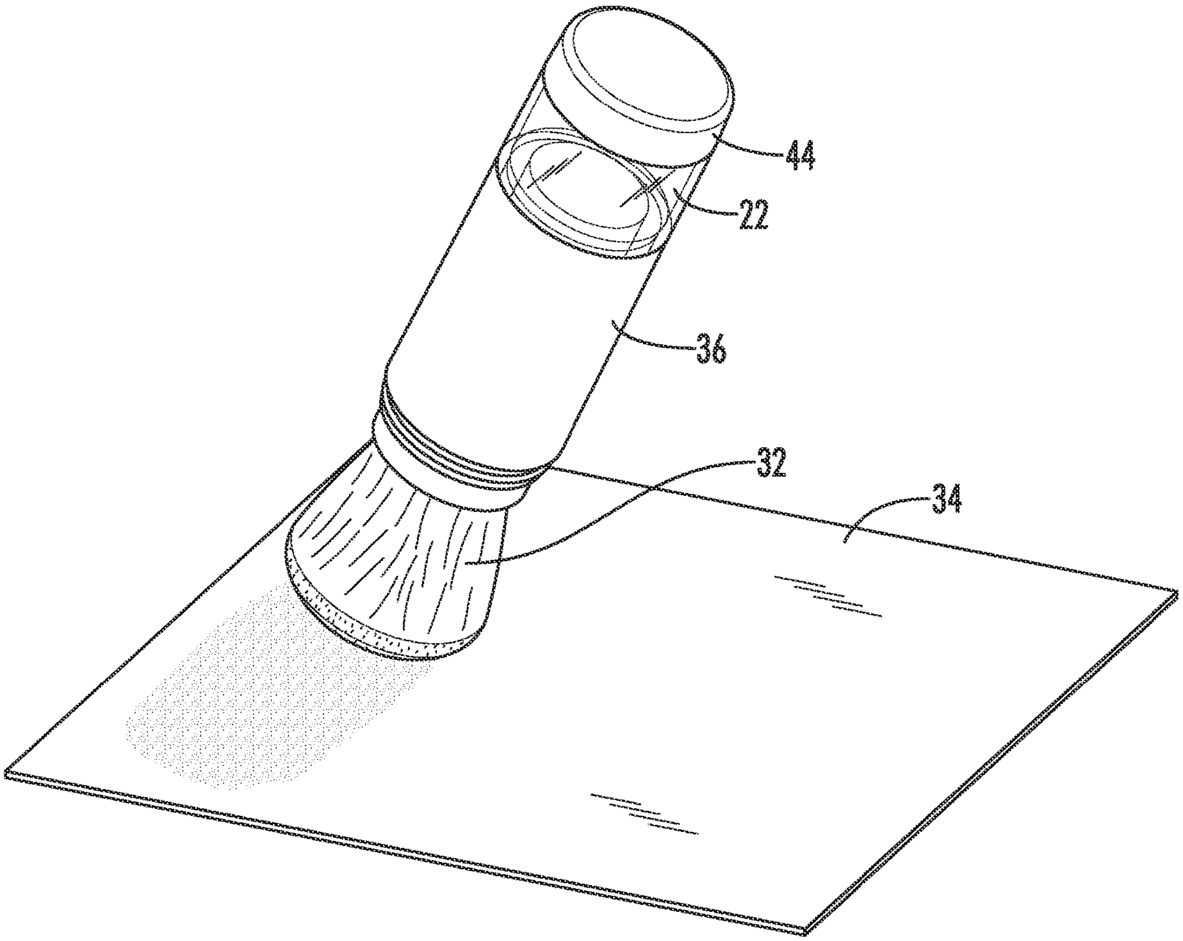
FIG. 12 illustrates a side perspective view of the applicator of FIG. 1 with the top cap removed, the removable sleeve in the resting position, and the bristles applying powder to a paper substrate.
Figure 13:
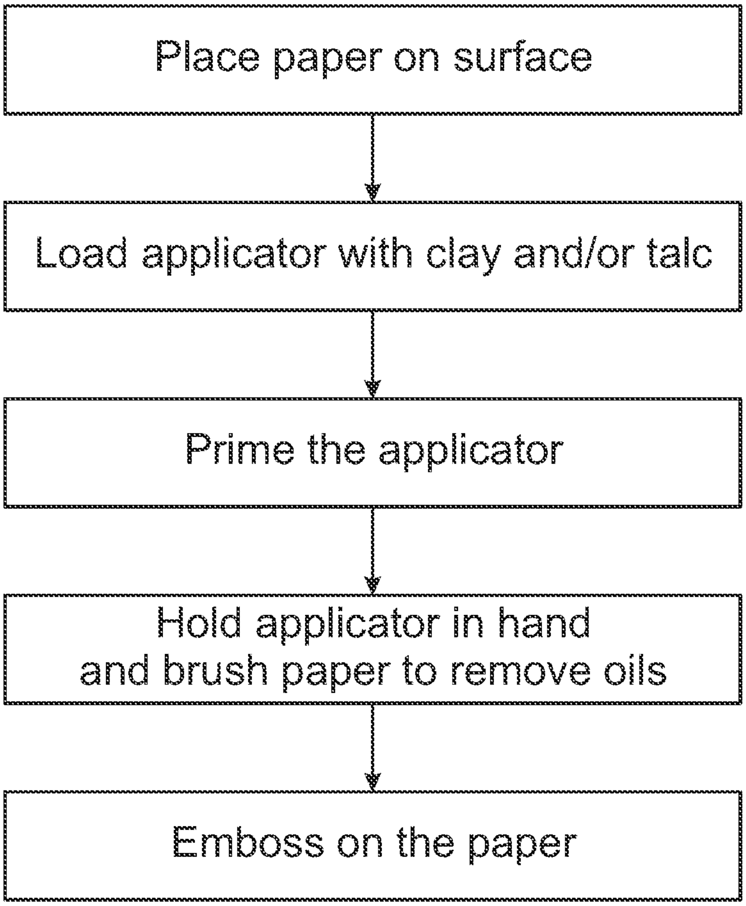
FIG. 13 is a flow chart describing one method of using the applicator of the present invention.

Optionally, as shown in FIG. 12, the method further comprises b) providing a paper substrate 34; c) positioning the applicator head 32 on the paper substrate 34; d) allowing the powder 24 to contact the paper substrate 34 and/or applicator head 32; and/or e) using the applicator head 32 to brush the paper substrate 34 with the powder 24.

Optionally, the powder 24 comprises talc and/or clay and is off-white (e.g., white with a yellowish tinge). Optionally, the powder 24 comprises kaolin clay, preferably, cosmetic grade kaolin clay. Without being bound by any particular theory, it has been found that kaolin clay is beneficial because it does not thicken, and also neutralizes the oils.

Figure 8:
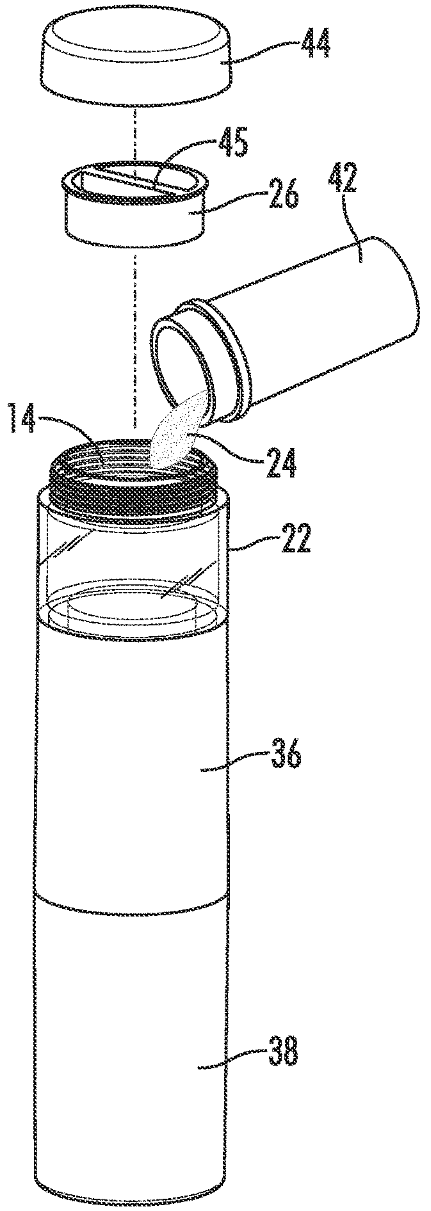
FIG. 8 illustrates a side perspective, partially-exploded view of the applicator of FIG. 7 with the top cap and removable lid removed and a user dispensing powder from a powder container into the reservoir.
Figure 9:
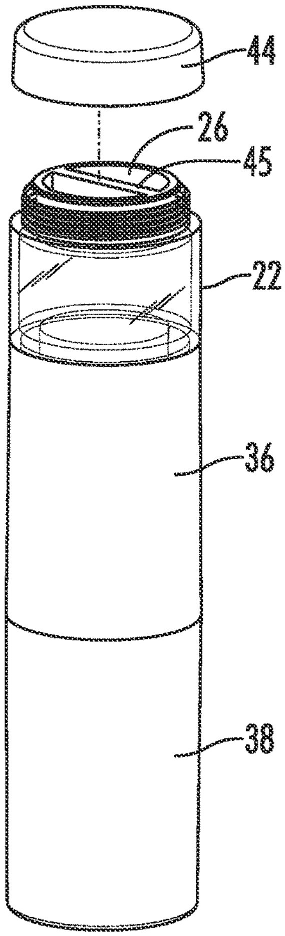
FIG. 9 illustrates a side perspective, partially-exploded view of the applicator of FIG. 8 with the top cap removed.
Figure 10:
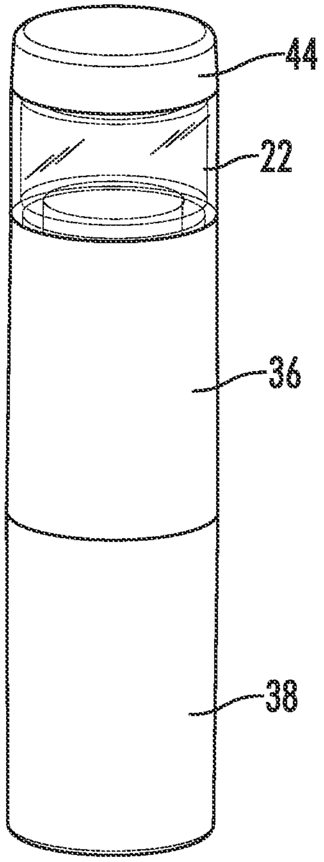
FIG. 10 illustrates a side perspective view of the applicator of FIG. 1 with the removable sleeve in the resting position.
Figure 11:
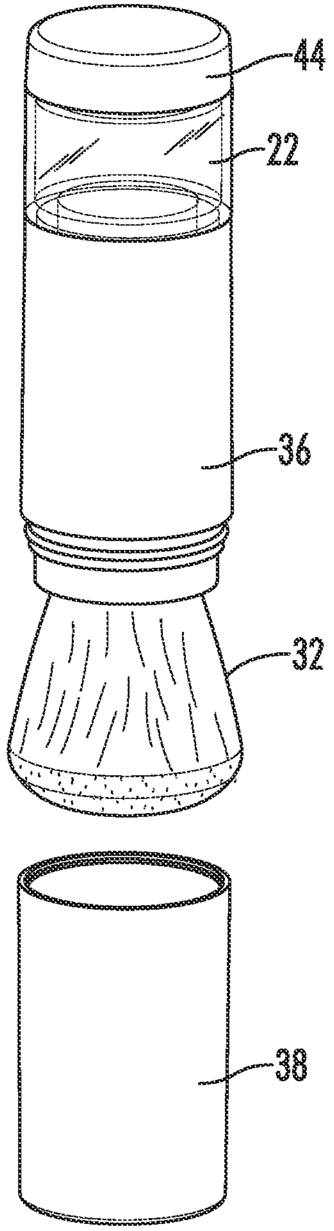
FIG. 11 illustrates a side perspective, partially-exploded view of the applicator of FIG. 10 with the removable sleeve in the resting position and the removable cap removed.

Optionally, a user dispenses the powder 24 from a powder container 42 into the reservoir 22 after removing the top cap 44 and removable lid 26, as shown in FIG. 8. In the illustrated embodiment, the removable lid 26 seals the reservoir 22. Optionally, the removable lid 26 is comprised of semi-rigid plastic and is press fit into the reservoir 22 to provide a seal, and further includes a central rib 45 to allow a user to remove with a pair of pliers, for example.

Optionally, step b) further comprises positioning the paper substrate 34 on a surface (e.g., placing the paper substrate on a table).

Optionally, prior to use, the user "primes" the applicator head 32 with the powder 24. For example, optionally, the housing 12 further comprises a slideable sleeve 36 and step d) comprises allowing the powder 24 to contact the applicator head 32 by attaching a removable cap 38 to the slideable sleeve 36 and moving the slideable sleeve 36 towards the removable lid 26 of the reservoir 22 (i.e., from a resting position to a position where the slideable sleeve 36 is over the bristles 32) to "prime" the applicator head 32 with the powder 24. Optionally, the housing 12 further comprises a ledge 40, which the slideable sleeve 36 contacts in the over-bristle position.

Optionally, the housing 10 is cylindrical.

Optionally, the channel(s) 30 are closeable by twisting slideable sleeve 36 clockwise or counter-clockwise.

Optionally, during use, a user holds the housing 12 in his or her hand. Optionally, step e) is performed without the user holding the paper substrate 34. Optionally, the paper substrate 34 of step b) comprises oils, and step e) comprises using the applicator head 32 to brush the paper substrate 34 with the powder 24 to remove oils from the paper substrate 34.

Optionally, the method further comprises f) embossing the paper substrate 34.

Without begin bound by any particular theory, the present method has been found to neutralize surface oils, static and applies microthin particulate powder 24 over sticky residue, debris and/or contaminants that could cause undesirable results in the heat embossing process.

| Parts List | |
|---|---|
| Applicator | 10 |
| Housing | 12 |
| Housing Interior | 14 |
| Housing Bottom | 16 |
| Housing Top | 18 |
| Housing Height | 20 |
| Reservoir | 22 |
| Powder | 24 |
| Removable Lid | 26 |
| Base | 28 |
| Channel(s) | 30 |
| Applicator Head | 32 |
| Paper Substrate | 34 |
| Slideable Sleeve | 36 |
| Removable Cap | 38 |
| Ledge | 40 |
| Powder Container | 42 |
| Top Cap | 44 |
| Central Rib | 45 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of preparing a paper substrate comprising the steps of:

a) providing an applicator comprising a housing comprising a top, a bottom, a height extending from the top to the bottom, an interior comprising a reservoir, the reservoir comprising a solid substance in the form of a powder consisting essentially only of kaolin clay, a removable lid, and a base opposite the removable lid and comprising a channel, the applicator further comprising a brush comprising a plurality of bristles extending from the bottom of the housing and in communication with the channel;

b) providing a paper substrate comprising oils and/or static;

c) holding the housing in a human user's hand and positioning the brush on the paper substrate;

d) allowing the powder consisting essentially only of kaolin clay to travel from the reservoir and contact the paper substrate and/or brush wherein in steps a)-d) said reservoir does not contain any substance other than said solid substance in the form of a powder consisting essentially only of kaolin clay;

e) using the plurality of bristles to move the powder consisting essentially only of kaolin clay about the paper substrate wherein said moving of said powder consisting essentially only of kaolin clay about the paper substrate removes oils and/or static from the paper substrate; and f) heat embossing the paper substrate.

2. The method of claim 1 wherein the plurality of bristles are comprised of nylon.

3. The method of claim 1 wherein step b) further comprises positioning the paper substrate on a surface and step e) further comprises placing the brush on top of the paper substrate.

4. The method of claim 1 wherein the housing further comprises a slideable sleeve attached to a removeable cap and step d) comprises allowing the powder to contact the brush by placing the removable cap over the brush and moving the slideable sleeve towards the removable lid of the reservoir.

5. The method of claim 4 wherein the housing further comprises a ledge located above the slideable sleeve.

6. The method of claim 1 wherein the housing is cylindrical.

7. The method of claim 1, wherein step e) is performed without the human user holding the paper substrate and without adding oils from the human user to the paper substrate.

8. The method of claim 1 wherein the reservoir comprises a clear sidewall.

* * * * *